United States Patent [19]

Hendry

[11] Patent Number: 4,855,094
[45] Date of Patent: Aug. 8, 1989

[54] METHOD FOR THE INJECTION MOLDING OF PLASTIC ARTICLES USING FLUID PRESSURE

[75] Inventor: James W. Hendry, Spring Hill, Fla.

[73] Assignee: Michael Ladney, Sterling Heights, Mich.

[21] Appl. No.: 98,862

[22] Filed: Sep. 21, 1987

[51] Int. Cl.$^4$ .................... B29C 45/34; B29C 45/46; B29C 45/77

[52] U.S. Cl. .................... 264/40.3; 264/40.7; 264/328.8; 264/328.9; 264/328.12; 264/328.13; 264/500; 264/572; 425/562; 425/568; 425/573

[58] Field of Search .................. 264/328.7, 513, 572, 264/40.3, 40.7, 328.12, 328.8, 328.9, 328.13, 500; 425/533, 535, 387.1, 573, 562–564, 566, 568

[56] References Cited

U.S. PATENT DOCUMENTS

| | | |
|---|---|---|
| 2,331,688 | 10/1943 | Hobson . |
| 2,345,144 | 3/1944 | Opavsky . |
| 2,714,747 | 8/1955 | Lindemann et al. . |
| 2,714,748 | 12/1952 | Stirnemann et al. . |
| 2,940,123 | 7/1958 | Beck et al. . |
| 3,021,559 | 7/1962 | Strong . |
| 3,135,640 | 6/1964 | Kepka et al. . |
| 3,687,582 | 8/1972 | Hendry et al. . |
| 3,966,372 | 6/1976 | Yasuike et al. . |
| 4,033,710 | 7/1977 | Hanning . |
| 4,078,875 | 3/1978 | Eckardt . |
| 4,082,226 | 4/1978 | Appleman et al. . |
| 4,092,389 | 5/1978 | Sakurai . |
| 4,101,617 | 7/1978 | Friederich .......................... 264/572 |
| 4,106,887 | 8/1978 | Yasuike et al. . |
| 4,129,635 | 12/1978 | Yasuike et al. . |
| 4,136,320 | 1/1979 | Olabisi . |
| 4,140,672 | 2/1979 | Kataoka . |
| 4,234,642 | 11/1980 | Olabisi . |
| 4,247,515 | 1/1981 | Olabisi . |
| 4,333,603 | 6/1982 | Hendry . |
| 4,357,296 | 11/1982 | Hafele . |
| 4,474,717 | 10/1984 | Hendry ............................. 264/572 |
| 4,555,225 | 11/1985 | Hendry . |
| 4,601,870 | 7/1986 | Sasaki .............................. 264/572 |
| 4,604,044 | 8/1986 | Hafele . |
| 4,685,881 | 8/1987 | Sasaki .............................. 264/572 |
| 4,740,150 | 4/1988 | Sayer . |

FOREIGN PATENT DOCUMENTS

| | | |
|---|---|---|
| 1929343 | 12/1970 | Fed. Rep. of Germany . |
| 2106546 | 8/1972 | Fed. Rep. of Germany . |
| 120318 | 6/1975 | Japan . |
| 1460101 | 12/1976 | United Kingdom . |
| 1487187 | 9/1977 | United Kingdom . |
| 2139548 | 11/1984 | United Kingdom . |

Primary Examiner—Jan H. Silbaugh
Assistant Examiner—Neil M. McCarthy
Attorney, Agent, or Firm—Brooks & Kushman

[57] ABSTRACT

A method and associated apparatus for the injection molding of plastic articles of enhanced surface quality using fluid pressure. The method involves the initial step of injecting molten plastic at a nominal injection pressure from an injection molding machine through a flow path to a mold cavity defining the shape of the molded article. A charge of fluid pressurized at a predetermined level no greater than the nominal plastic injection pressure is communicated to the plastic flow path through an orifice of sufficiently small dimension to resist entry of the molten plastic against the pressure of the fluid charge. The pressurized charge of fluid responds to a reduction of the pressure in the plastic flow path below the predetermined level upon substantial completion of plastic injection and enters the flow path and passes into the mold cavity. The fluid is contained within the mold cavity under pressure until the article has set up, and is thereafter vented to atmosphere.

10 Claims, 5 Drawing Sheets

```
┌─────────────────────────────────────────┐
│  PRESSURIZING A CHARGE OF FLUID AT A    │
│ PREDETERMINED PRESSURE LEVEL LESS THAN A│
│    NOMINAL PLASTIC INJECTION PRESSURE   │
└─────────────────────────────────────────┘
                    │
┌─────────────────────────────────────────┐
│   INJECTING A QUANTITY OF MOLTEN PLASTIC│
│   THROUGH AN INJECTION FLOW PATH INTO A │
│    MOLD CAVITY AT THE NOMINAL INJECTION │
│                 PRESSURE                │
└─────────────────────────────────────────┘
                    │
┌─────────────────────────────────────────┐
│  COMMUNICATING THE CHARGE OF PRESSURIZED│
│   FLUID DURING THE PLASTIC INJECTION TO │
│     THE FLOW PATH THROUGH AN ORIFICE OF │
│   SUFFICIENT DIAMETER TO PREVENT FLUENT │
│        ENTRY OF THE MOLTEN PLASTIC      │
└─────────────────────────────────────────┘
                    │
┌─────────────────────────────────────────┐
│    INTRODUCING THE FLUID CHARGE INTO THE│
│  FLOW PATH UPON SUBSTANTIAL COMPLETION OF│
│   THE PLASTIC INJECTION IN RESPONSE TO A│
│    REDUCTION OF THE PRESSURE IN THE FLOW│
│     PATH BELOW THE PREDETERMINED LEVEL  │
└─────────────────────────────────────────┘
                    │
┌─────────────────────────────────────────┐
│     CONTAINING THE FLUID UNDER PRESSURE │
│   WITHIN THE ARTICLE UNTIL IT HAS SET UP│
│             IN THE MOLD CAVITY          │
└─────────────────────────────────────────┘
                    │
┌─────────────────────────────────────────┐
│        VENTING THE FLUID TO AMBIENT     │
└─────────────────────────────────────────┘
```

*Fig. 1*

METHOD FOR THE INJECTION MOLDING OF PLASTIC ARTICLES USING FLUID PRESSURE

TECHNICAL BACKGROUND

This invention relates to a method and apparatus for the injection molding of plastic articles using fluid pressure.

BACKGROUND ART

It is known in the plastic molding art to use pressurized fluid in conjunction with the plastic molding of articles. The pressurized fluid is typically nitrogen gas which is introduced into the mold cavity with the molten plastic.

The pressurized fluid serves at least two purposes. First, it allows the article so formed to have hollow interior portions which correspond to weight and material savings. Second, the pressurized fluid within the mold cavity applies outward pressure to force the plastic against the mold surfaces while the article sets up. This is desirable toward enhancing surface quality by minimizing sink marks in areas of the article having relatively thicker plastic sections, such as structural ribs.

However, the added equipment and process control parameters required to implement fluid injection contribute significantly to the cost and complexity of this type of injection molding.

Of particular concern are the fluid charging components and circuits needed to charge, inject and vent the pressurized fluid at the controlled times and pressures necessary for quality part production on a repeatable, volume basis. Prior art devices addressing this concern have answered with complex valves and seals which are expensive, difficult to operate, and require maintenance or replacement at frequent intervals. The problem is especially acute with seals whose performance diminishes over their useful life.

DISCLOSURE OF THE INVENTION

In accordance with the present invention a method and associated apparatus are provided for the injection molding of plastic articles using a pressurized fluid, normally nitrogen gas.

The invention calls for the pressurization of a charge of fluid at a predetermined pressure level no greater than, and typically less than, a nominal injection pressure associated with the injection of molten plastic from a molding machine through a flow path to a mold cavity. The charge of pressurized fluid is communicated to the flow path through an orifice of sufficiently small dimension to resist fluent entry of the relatively more viscous molten plastic during regular plastic injection. The pressurized charge of fluid responds to a reduction of pressure in the flow path below the predetermined level upon substantial completion of injection of the molten plastic. The fluid charge generally follows the molten plastic into the mold cavity and channels through the paths of least viscosity, typically thickened sections, to form a fluid distribution network within the molded article. The fluid exerts internal pressure to minimize surface defects, such as sink marks. The pressurized fluid is contained within the mold cavity while the plastic article solidifies, and is thereafter vented to ambient.

Unlike some of similar hollow plastic injection molding methods and apparatus wherein the fluid pressure is maintained at a higher level then the nominal plastic injection pressure, the fluid pressure in the present invention is generally less than the nominal plastic injection pressure. This reduces substantially the risk of fluid being prematurely introduced into the flow path and causing a rupture or blow out of the plastic before it has solidified sufficiently to define the shape of the article to be molded.

The fluid charge pressure is sufficiently high, however, and the dimension of the orifice through which the fluid is introduced into the flow path is sufficiently small, to prevent the entry and diversion of molten plastic into the fluid line communicating the charge to the flow path. Thus, a check valve, such as those required in the fluid lines of prior art apparatus to prevent plastic entry into fluid lines, and which, as a result of their use, introduce fluid venting problems, is not required.

In another feature of the present invention the preferred location for the fluid entry point is downstream of the injection nozzle in an area where the plastic is relatively cold. In conventional prior art designs the fluid entry point is through the injection nozzle in an area where the plastic is relatively hot. In the latter type of design a one-way valve is needed to keep the hot plastic from flowing back and leaving a residual quantity of aereated plastic in the nozzle for the next successive molding cycle upon separation of the nozzle and mold sprue. This quantity of residual plastic is undesirable and contaminates the plastic composition of the next molded article.

BRIEF DESCRIPTION OF THE DRAWINGS

FIG. 1 is a flow chart setting forth the operational steps of the method of the present invention;

BEST MODE FOR CARRYING OUT THE INVENTION

The present invention will be first described by reference to the operational steps of the method. Second, the apparatus employed in the preferred embodiment will be described. Finally, the operation of the apparatus in accordance with the method will be described in connection with an injection molding cycle.

General Method Of Operation

Figure is a flow chart setting forth the general operational steps involved in the method of the present invention. In overview, the method provides for molding of plastic articles with hollow interior sections where pressurized fluid is present in the formation of the article in the mold cavity. The presence of the pressurized fluid creates an outward pressure which minimizes sink marks and reduces the material requirements and weight of the molded article.

In step 1, a charge of fluid is pressurized at a predetermined level which is selected to be no greater than, and typically lower than, the nominal plastic injection pressure.

In step 2, a quantity of molten plastic is injected from the nozzle of a conventional injection molding machine through a flow path into a mold cavity at the nominal injection pressure. The quantity of molten plastic, i.e. the plastic shot, is less than the quantity of plastic which would be ordinarily required to fill the mold cavity.

In step 3, the charge of pressurized fluid, preferably nitrogen gas, is communicated from a chamber where it is introduced into the flow path through an orifice of sufficiently small dimension to resist entry of the relatively viscous molten plastic. The relatively greater pressure associated with injection of the molten plastic prevents entry of the fluid charge into the plastic flow until substantial completion of the injection stroke of the molding machine.

In step 4, the charge of pressurized fluid responds to a reduction of the pressure in the flow path associated with substantial completion of the plastic injection. This causes the fluid charge to enter the flow path and to continue into the mold cavity. The entry of the fluid charge into the cavity is self-executing in response to the pressure drop at the end of the plastic injection stroke, and no timers, valves or the like are specifically required to introduce the fluid charge into the plastic melt in the mold cavity.

In step 5, the pressurized fluid is contained within the molding while the plastic solidifies and defines the shape of the molded article. During this time pressurized fluid exerts outward pressure which forces the plastic to conform to the detail of the mold surface and exhibit fine detail with minimal sink marks or other surface defects.

In step 6, the fluid is vented to ambient from the mold cavity prior to opening the mold and removing the finished molded article.

Description Of The Apparatus

Figure 2:
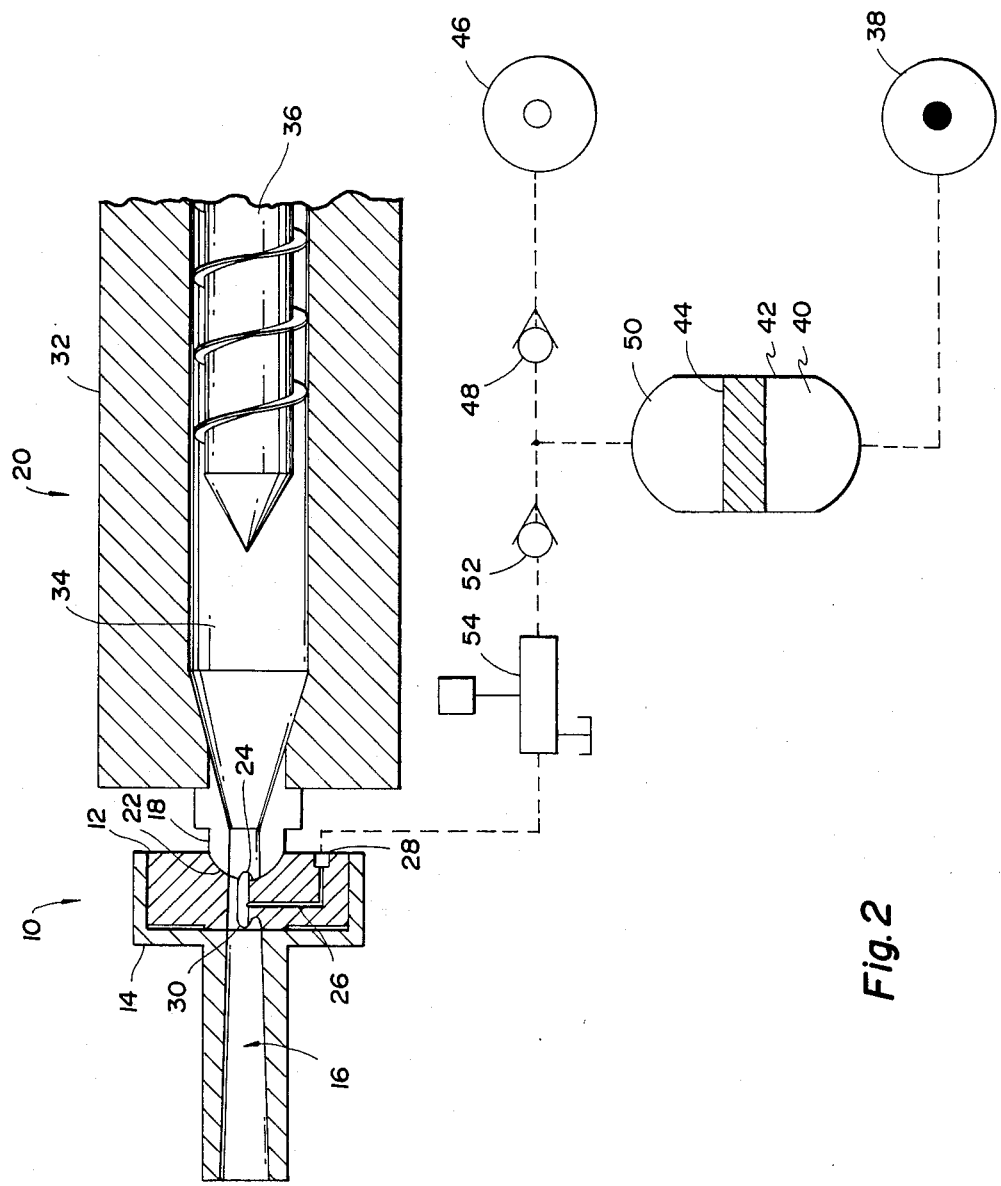
FIG. 2 is a general schematic view of an apparatus constructed in accordance with the present invention.

FIG. 2 is a general schematic view of apparatus suited for practicing the plastic injection molding method of the present invention.

The controlled entry of pressurized fluid, typically nitrogen gas, is accomplished by use of a modified mold sprue 10. The sprue 10 includes a disk-shaped insert 12 disposed within a sprue body 14.

The mold sprue 10 cooperates with a conventional plastic injection molding machine 20. The nozzle 18 of the molding machine 20 mates with a concave surface 22 on the face of the insert 12 to provide a continuous path 16 for the flow of plastic from the machine through the sprue 10 and into a mold cavity (not shown).

The flow of molten plastic through the insert 12 may be diverted by a conventional torpedo 24 of the type well known in the art.

The introduction of pressurized fluid to the flow path is through passage segments 26 and 28 formed (by drilling or the like) in the insert. The passage 26 opens into the flow path through an orifice 30 of sufficiently small dimension, e.g. 0.005–0.040 in., depending on the viscosity of the plastic, to effectively prevent entry of the relatively high viscous molten plastic during injection.

The plastic injection molding machine 20 includes a barrel 32 with a central cylindrical opening 34. A screw 36 serves to plasticize and advance resin toward the nozzle area. Upon complete plasticization of the resin the screw 36 is hydraulically advanced toward the head of the barrel 32 to inject molten plastic through the nozzle 18. The plastic passes through the sprue insert 12 at a nominal plastic injection pressure through the stroke of the screw 36. This pressure falls upon substantial completion of the stroke and discharge of the plastic from the barrel 32 of the molding machine 20.

Figure 3:
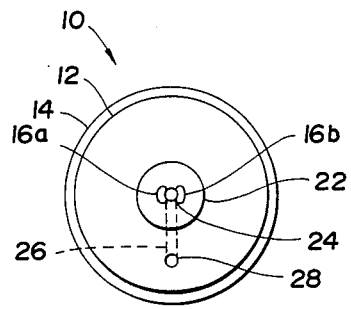
FIG. 3 is an end view of a sprue bushing employed in the apparatus of FIG. 2.
Figure 4:
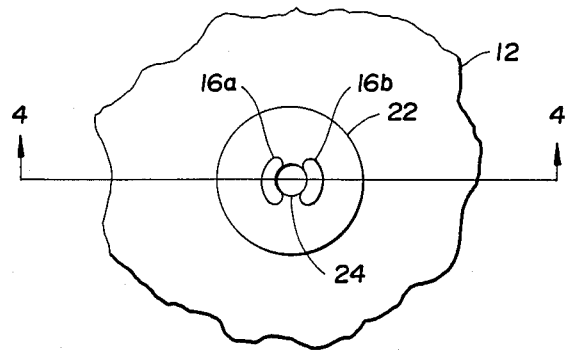
FIG. 4 is a fragmentary enlarged view of the central portion of the sprue bushing of FIG. 3.
Figure 5:
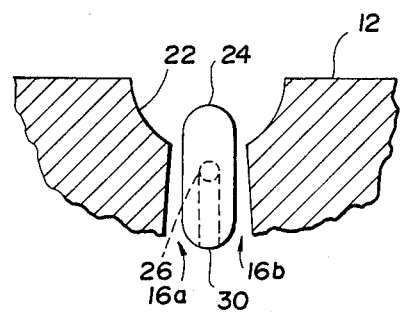
FIG. 5 is a sectional view of the central portion of the sprue bushing taken along line 4—4 of FIG. 4.

The sprue bushing or insert 12 is illustrated in greater detail in FIGS. 3, 4 and 5.

The insert 12 is shown mounted concentrically in a recess in the sprue body 14. Molten plastic passes from the nozzle and around the torpedo through a pair of kidney-shaped apertures 16a and b which serve as first and second branches in the flow path. The pressurized fluid is communicated to the plastic path flow through passage segment 26 and orifice 30 which is mediate the plastic flow branches and co-linear therewith.

The temperature of the insert 12 can be controlled depending on the processing specifications of the plastic being used by employing electrical heater bands or other types of auxiliary heat sources as is well known in the art.

Again with reference to FIG. 2, the apparatus also includes a mechanism for charging and communication of pressurized fluid, or gas, to the sprue insert 12.

A hydraulic fluid supply 38 directs a working fluid, such as oil, under pressure to a chamber 40 of an accumulator 42 effectively separated into two chambers, having mutually and inversely variable volumes, by a compression piston 44. A fluid supply 46 is provided for directing a charge of gas through a first check valve 48 into the second chamber 50 of the accumulator 42 for pressurization. A valve 54 controls communication of gas from the chamber 50 to the sprue insert 12. A second check valve 52 is connected in series with the control valve 54.

Operation

A typical plastic injection molding cycle is initiated by directing a charge of fluid, normally nitrogen gas, under pressure from the fluid supply 46 into the chamber 50 of the compression cylinder 42, and then directing oil, also under a predetermined pressure from the hydraulic fluid supply 38, into the first chamber 40 of the compression cylinder 42. The compression piston 44 maintains the amount of gas held in the second chamber 50 at a constant pressure as a function of the pressure of the oil in the first chamber 40.

Plastic resin is melted and fed by the rotating screw 36 into the plastic injection apparatus forward chamber of the cylinder 34. When the molten plastic has been accumulated therein, the screw 36 is advanced linearly, forcing the molten plastic through the nozzle 18 and into the flow path 16.

During the plastic injection stroke, the gas charge in the second chamber 50 of the cylinder 42 is communicated through fluid lines and the segments 26 and 28 in the sprue bushing insert 12 to the fluid injection orifice 30 in the downstream end of the torpedo 24. The fluid pressure at the orifice 30 is at a predetermined level which is less than that of the nominal plastic injection pressure, but it is sufficiently high and the dimension of the orifice 30 is sufficiently small to effectively resist the entry of molten plastic thereinto. The level of fluid pressure at the orifice 30 may be determined through a few manual trial cycles and review of the surface quality of the molded articles produced at the trial pressures.

As the plastic injection stroke is substantially completed, the pressure of the plastic will fall below the predetermined pressure of the fluid at the orifice 30. The fluid responds by following the plastic along flow path 16 into the mold cavity.

As the gas is injected, it follows the path of least resistance within the mold cavity. Since the molten plastic cools and hardens from its outer surface inwardly, the gas will penetrate the inner, warmer, softer part of the plastic normally formed with thicker sections, e.g. a structural rib, creating a hollow within the plastic in this area and expanding it outwardly to fill the mold cavity. During the gas injection phase of the molding cycle, the gas pressure can be held at an effectively constant level by maintaining an application of constant oil pressure against the compression piston 44 in the compression cylinder 42; or it can be allowed to decay as the gas expands within the plastic.

In practice it has been found that the injected fluid meets with an initial resistance upon reaching the plastic in the mold cavity, and once it penetrates the plastic the resistance steps down substantially. Hence, an initially higher breakthrough pressure should be maintained for the fluid, and thereafter the fluid pressure can be decreased, in a step function or otherwise, to avoid unnecessarily high fluid pressure within the plastic article while it is setting up in the mold cavity. A controlled reduction in pressure will tend to minimize the chance of rupturing the plastic before it has cooled and hardened.

After the plastic has completely filled the mold cavity and the gas flow though the fluid injection orifice 30 has terminated, the oil that had been introduced under pressure to the chamber 40 of the accumulator 42 is evacuated. Subsequently, when the plastic article has cooled sufficiently to be structurally self-supporting, the gas within it is vented to atmosphere under control of the valve 54 through the same passages 26 and 28 by which it entered the insert 12. It is preferred to meter or regulate the ventilation of gas to ambient to minimize the risk of drawing any fluent plastic or impurities with the fluid and thereby contaminating or clogging the fluid path. The mold can then be opened and the molded article ejected.

Figure 6:
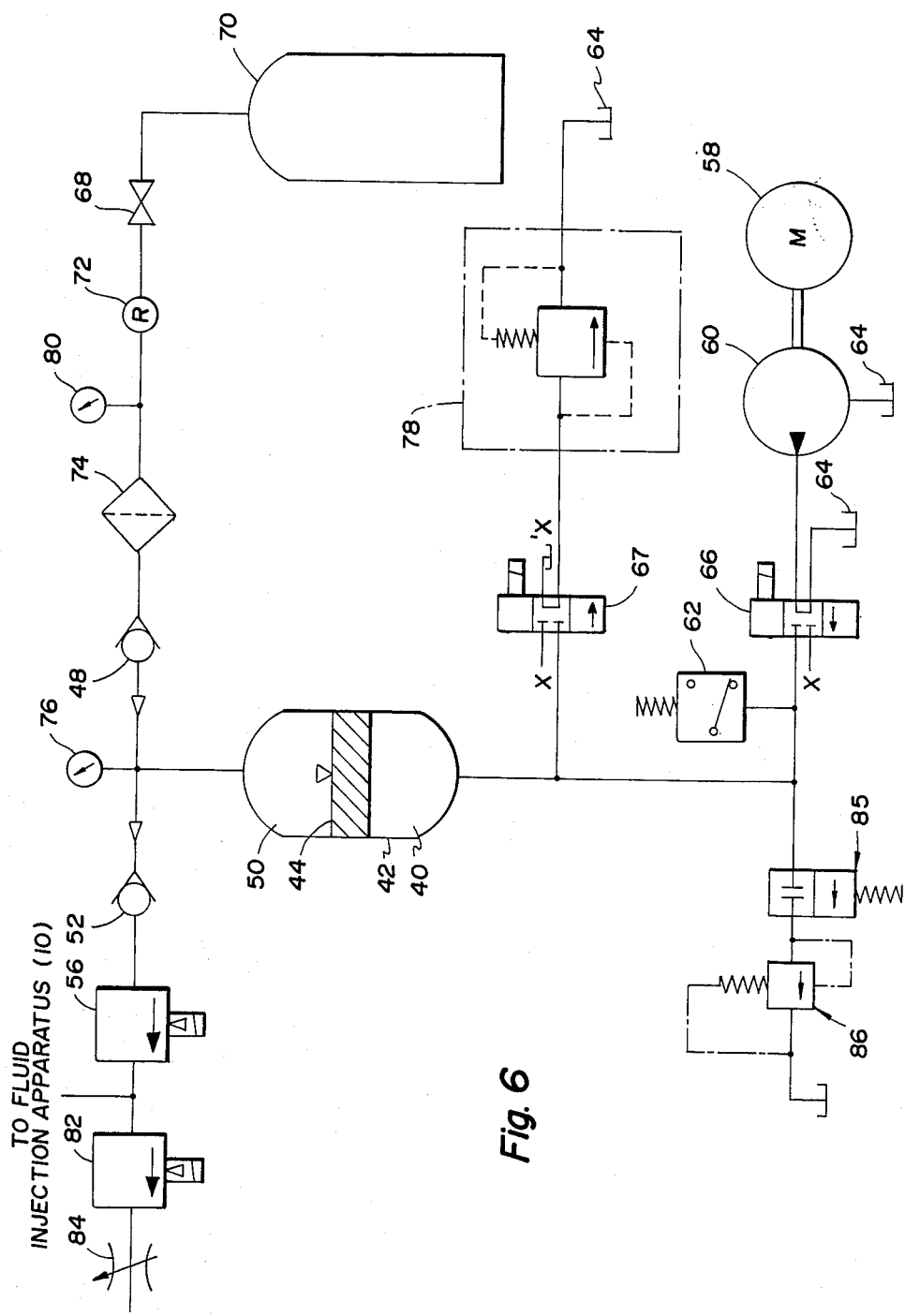
FIG. 6 is a detailed schematic view of the pressurized fluid circuit shown schematically in FIG. 2.

With reference to FIG. 6, the mechanism for charging and pressurizing fluid, or gas, for use in the subject molding process will be described in greater detail.

Initially, power is applied to an electric motor 58, which drives a hydraulic pump 60, forcing hydraulic fluid, or oil, at a pressure controlled by a pressure switch 62, from a reservoir 64 through a directional control valve 66 in its neutral position and back to the reservoir. A shut-off valve 68 is next opened, allowing pressurized fluid, or gas, to flow from a fluid supply, or tank, 70 through a pressure regulator 72, an in-line filter 74 and a check valve 48 and into the chamber 50 of the accumulator 42. This charge of gas is retained in the chamber 50 by the check valve 48 and a directional control valve 56.

The directional control valve 66 is energized, and oil is directed to the chamber 40 of the accumulator 42, forcing the compression piston 44 upward and applying pressure thereby to the gas residing in the chamber 50 of the compression cylinder. When the pressure of the oil has reached a preset level controlled by a selected setting on the pressure switch 62 and indicated by a gas pressure gauge 76, the directional control valve 66 is de-energized, isolating the oil in the chamber 40 at this pressure. The directional control valve 56 is then opened long enough to communicate the gas in the chamber 50 of the accumulator 42 through the passages 26 and 28 in the insert 12 shown in FIG. 2 to the injection orifice 30.

Adjustments to the level of the pressure created by the action of the compression piston 44 upon the gas within the second chamber 50 of the compression cylinder 42 can be made at this time by altering the setting of the pressure switch 62 and repeating the previously described preparation cycle until the desired pressure is indicated by the pressure gauge 76.

The directional control valve 67 is energized; and the gas pressure in the chamber 50 forces the compression piston 44 downward, in turn forcing the oil out of the first chamber 40 and through the directional control valve 67 and a counterbalance valve 78 to the reservoir 64. The pressure of the oil being directed to the reservoir 64 is controlled by the counterbalance valve 78, which is set at a pressure slightly below that of the pressure regulator 72. The gas pressure between the latter and the check valve 48 is indicated by a pressure gauge 80.

Following the previously described preparation, a first cycle of operation may be initiated by rotating the screw 36 in the plastic injection molding machine 20 shown in FIG. 2 until a predetermined amount of molten plastic has accumulated in the forward chamber 34 of cylinder 32. Directional control valve 66 shown in FIG. 5 is then energized; and oil is directed to the chamber 40 of the accumulator 42, forcing the compression piston 44 upward and applying pressure thereby to the gas residing in the chamber 50. When the oil pressure has reached the predetermined level controlled by the pressure switch 62, the directional control valve 66 is de-energized, isolating the oil in the chamber 40 at this pressure and thereby maintaining the charge of gas in the chamber 50 at the same pressure.

The screw 36 in the plastic injection molding machine in FIG. 2 is then advanced linearly, forcing the molten plastic accumulated in the injection cylinder chamber 34 through the nozzle 18 and into the flow path 16 leading to the mold cavity (not shown). As shown in detail in FIGS. 3-5, within the sprue bushing insert 12, the torpedo spreads the plastic into first 16a and second 16b paths, the cross-sectional areas of which increase in the direction of the plastic flow. At a selected point during or after the linear advance of the screw 36, the directional control valve 56 shown in FIG. 6 is opened, allowing the gas in the chamber 50 to flow through the second check valve 52 and directing it through the passage segments 26 and 28 shown in FIG. 2 to the orifice 30 in the downstream end of the torpedo 24.

After the plastic has filled the mold cavity, the directional control valve 56 is closed, capturing the gas in the mold cavity. The directional control valve 66 is energized, only if the oil and gas pressures were maintained constant during the gas injection phase; and the gas pressure in the chamber 50 forces the compression piston 44 downward, in turn forcing the oil out of the chamber 40 and through directional control valve 67 and the counterbalance valve 78 to the reservoir 64. The pressure of the oil being directed to the reservoir 64 is controlled by the counterbalance valve 78, which is set at a pressure slightly below that of the pressure regulator 72. The gas pressure between the latter and the check valve 48 is indicated by the pressure gauge 80.

After the compression piston 44 has moved to its fully retracted position, directional control valve 67 is de-energized and the valve 66 is energized. Oil is directed to the first chamber 40 of the accumulator 42, once again forcing the piston 44 upward and compressing the gas present in the second chamber 50. When the oil pressure has reached the predetermined level controlled by the pressure switch 62, the directional control valve 66 is de-energized, isolating the oil in the chamber 40 at this pressure and thereby maintaining the charge of gas in the second chamber 50 at the same pressure, ready for the next plastic injection cycle.

After the plastic article has cooled sufficiently within the mold cavity to be structurally self-supporting, a directional control valve 82 is opened, venting the gas from within the hollow plastic article at a metered rate controlled by a flow control valve 84. Thereafter, the directional control valve 82 is closed and the completed article is ejected from the mold.

In an alternative arrangement, the pressure of the fluid during injection into the mold cavity can be regulated in stages. As previously mentioned, the fluid meets with an initially greater resistance until it has penetrated the plastic. For this purpose the valve 85 may be actuated at a selected point in the fluid injection to reduce the pressure in chamber 40. The actuation of valve 85 can be determined on a pre-set time basis, or in response to a sensed pressure drop below a lower limit in the flow path. The sensed pressure drop would correlate with breakthrough of the fluid into the molten plastic. The valve 85 is cooperative with a counterbalancing valve 86 to permit a controlled flow of oil from chamber 40 to the reservoir 64.

Figure 7:
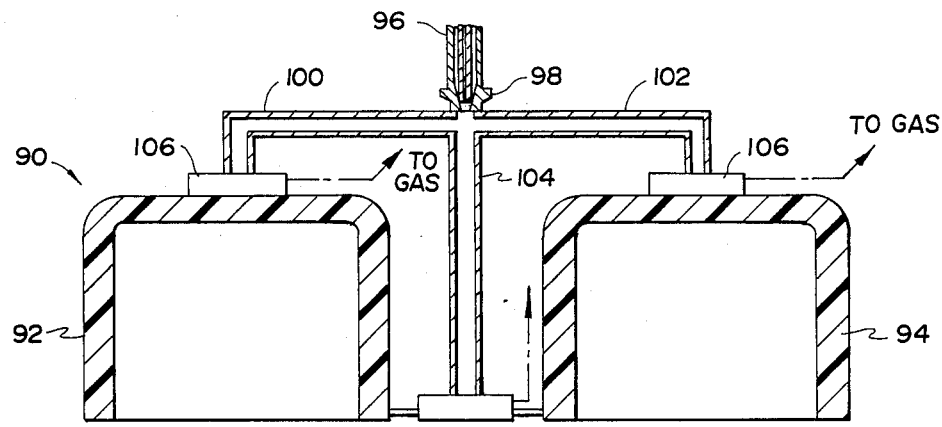
FIG. 7 is a general schematic view of the present invention adapted to a hot runner mold with multiple plastic and fluid entry points in the mold cavity.
Figure 8:
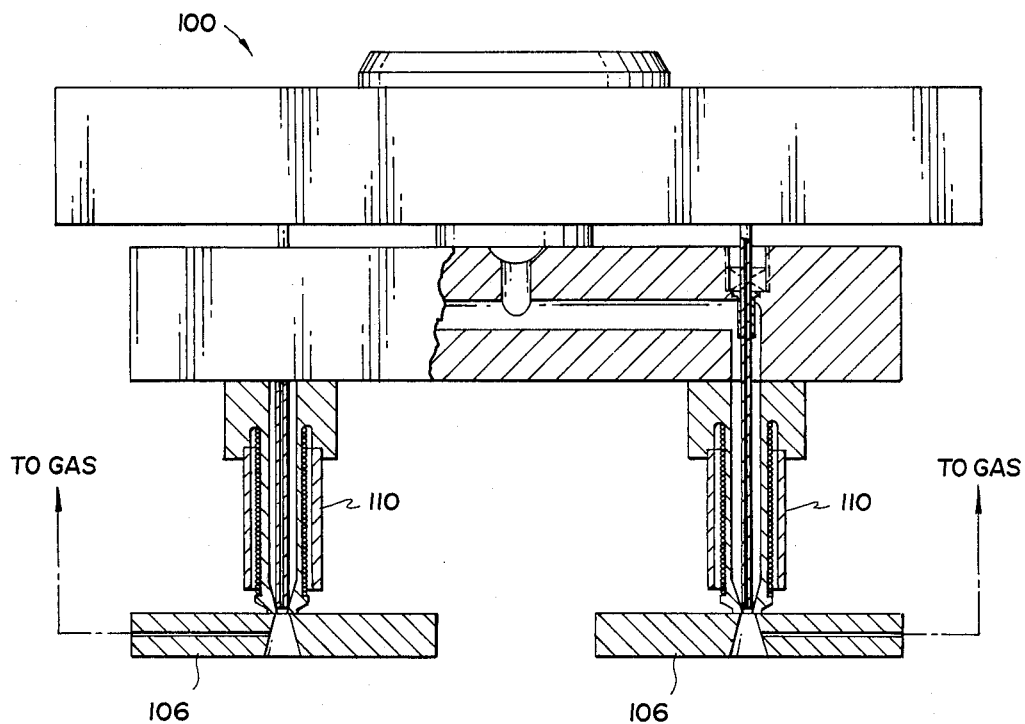
FIG. 8 is a more detailed diagrammatic view of a hot runner system adaptation consistent with the schematic view of FIG. 7.

In reference to FIGS. 7 and 8, the method of the present invention is shown adapted to a hot runner mold system in which a mold cavity has plural plastic entry points.

FIG. 7 is a schematic view of a typical mold 90 in cross section with two part cavities 92 and 94. A nozzle 96 mates with a sprue 98 to introduce molten plastic into a runner system having three branches 100, 102 and 104. At each plastic entry point a disk-shaped device 106, substantially of the construction of insert 12 of FIGS. 2-5, functions to permit the selective introduction of pressurized fluid into the cavity.

FIG. 8 is a more detailed diagrammatic view of a conventional hot runner manifold 108. The manifold includes separately adjustable nozzles 110 which supply plastic through the devices 106.

What is claimed is:

1. A method for injection molding a plastic article in a fluid assisted injection molding system, the method comprising the steps of pressurizing a charge of fluid at a predetermined pressure level no greater than a nominal plastic injection pressure; injecting a quantity of molten plastic through an injection flow path from an injection molding machine of the system into a mold cavity at the nominal plastic injection pressure; communicating the charge of pressurized fluid to the flow path during the step of injecting through an orifice immediately adjacent the flow path, the orifice having a sufficiently small dimension and the predetermined pressure level of the charge of fluid being sufficiently high at the orifice to resist entry of the molten plastic into the orifice, the pressure of the injected plastic in the flow path adjacent the orifice and the small dimension of the orifice preventing the fluid charge from entering the flow path at the orifice prior to completion of the step of injecting molten plastic; the fluid charge traveling through the orifice and into the flow path upon substantial completion of the plastic injection in a self-executing fashion in response to a reduction of the pressure of the plastic in the flow path below the predetermined pressure level of the fluid charge whereby residual plastic in the machine for the next molded article is not contaminated with the fluid; containing the fluid under pressure within the article until it has set in the mold cavity; and venting the fluid to ambient.

2. The method of claim 1 wherein the pressure of the charge fluid is maintained at the predetermined level while the fluid is being introduced into the flow path.

3. The method of claim 1 wherein the fluid is a gas.

4. The method of claim 1 wherein the charge of pressurized fluid is communicated to the flow path downstream of the nozzle of an injection molding machine.

5. The method of claim 1 wherein the pressure of the fluid charge is controlled initially at the predetermined level and thereafter reduced after introduction of the fluid charge into the mold cavity.

6. The method of claim 5 wherein the pressure of the fluid charge is reduced in a substantial step function.

7. The method of claim 5 wherein the pressure reduction of the fluid charge is effected upon penetration of the gas into the resin within the mold cavity.

8. The method of claim 1 wherein the fluid is vented from the article by metering the fluid.

9. The method of claim 1 wherein the pressurized fluid is vented through the same orifice as which introduced.

10. The method of claim 1 wherein the charge of pressurized fluid is communicated and introduced at plural flow path points.

* * * * *